United States Patent
Kroll et al.

(10) Patent No.: US 8,405,891 B2
(45) Date of Patent: Mar. 26, 2013

(54) HOLOGRAPHIC RECONSTRUCTION SYSTEM WITH AN ARRANGEMENT OF CONTROLLABLE MICROCELLS

(75) Inventors: Bo Kroll, London (GB); Armin Schwerdtner, Dresden (DE); Gerald Futterer, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 435 days.

(21) Appl. No.: 12/601,016

(22) PCT Filed: May 21, 2008

(86) PCT No.: PCT/EP2008/056272
§ 371 (c)(1),
(2), (4) Date: Apr. 12, 2010

(87) PCT Pub. No.: WO2008/142118
PCT Pub. Date: Nov. 27, 2008

(65) Prior Publication Data
US 2010/0194854 A1 Aug. 5, 2010

(30) Foreign Application Priority Data
May 21, 2007 (DE) .......................... 10 2007 024 236

(51) Int. Cl.
*G03H 1/08* (2006.01)
(52) U.S. Cl. ......................................................... 359/9
(58) Field of Classification Search .................... 348/40; 359/22, 9
See application file for complete search history.

(56) References Cited

U.S. PATENT DOCUMENTS 6,388,779 B1* 5/2002 Curtis et al. .................... 359/22
7,535,607 B2* 5/2009 Schwerdtner et al. ............ 359/9

FOREIGN PATENT DOCUMENTS

| WO | WO 2004/044659 | 5/2004 |
| WO | WO 2004/075526 | 9/2004 |
| WO | WO 2004/099847 | 11/2004 |
| WO | WO 2006/119760 | 11/2006 |
| WO | WO 2006/119920 | 11/2006 |

OTHER PUBLICATIONS

International Search Report, dated Oct. 10, 2008, issued in priority International Application No. PCT/EP2008/056272.
Smith et al., "Agile wide-angle beam steering with electrowetting microprisms," Optics Express, vol. 14, No. 14, pp. 6557-6563 (Jul. 10, 2006) XP002497446.

* cited by examiner

*Primary Examiner* — David Eng
(74) *Attorney, Agent, or Firm* — Saul Ewing LLP

(57) ABSTRACT

A holographic reconstruction system is disclosed for the three-dimensional reconstruction of object light spots of a scene, comprising spatial light modulation elements which modulate interference-capable light waves of illumination means with at least one video hologram, and optical focussing elements which focus the modulated light waves with the reconstructed object light spots for at least one eye position of the observer's eyes. An electro-optical deflection element controlled by a system controller focuses the modulated light wave with the reconstructed object light spots on at least one eye position and tracks them when the eye position changes. The electro-optical deflection element is a controllable optical diffraction grating with a variable surface relief structure consisting of separately controllable microcells.

11 Claims, 3 Drawing Sheets

HOLOGRAPHIC RECONSTRUCTION SYSTEM WITH AN ARRANGEMENT OF CONTROLLABLE MICROCELLS

CROSS REFERENCE TO RELATED APPLICATIONS

This application claims the priority of PCT/EP2008/056272, filed on May 21, 2008, which claims priority to German Application No. 10 2007 024236.2, filed May 21, 2007, the entire contents of which are hereby incorporated in total by reference.

BACKGROUND OF THE INVENTION

The present invention relates to a holographic reconstruction system for the three-dimensional reconstruction of a scene with spatial light modulator means, which carry a holographic code, and with illumination means for illuminating the light modulator means. The present invention chiefly relates to a real-time or near-real-time reconstruction of moving scenes with the help of sequences of video holograms. A hologram signal processor computes video holograms and encodes them on a modulator cell structure of spatial light modulator means which, when illuminated by illumination means which are capable of generating interference, spatially modulate at least one light wave front with holographic information. The modulated light wave front reconstructs the scene through interference of the light waves and thus propagates towards an eye position such that one or multiple observers can watch the reconstructed object light points as a three-dimensional reconstruction of a scene. This means that the reconstructed object light points represent the optical appearance of the scene in a three-dimensional manner in front of the eye positions. In reconstruction systems with low resolution of the modulator cells in the spatial light modulator means and reduced computational load for computing the video holograms, the modulated light wave front is preferably reduced with focussing means to a visibility region of few millimeters up to few centimeters. The reconstruction with a modulated wave front can then not be seen simultaneously by both eyes of an observer. The eyes of an observer can then be served in a time- or space-division multiplexed presentation of different video holograms which differ in parallax.

High-resolution, flat light modulators which have resolutions of several million pixels and which are used as screens in video and TV devices or projectors are for example particularly suited as light modulator means. They achieve the larger light diffraction angles the smaller the distance between the centres of the modulator cells, i.e. the modulator pitch.

A reconstruction system is known from the international publication WO 2004/044659, titled "Video hologram and device for reconstructing video holograms", which employs for spatial light modulation a liquid crystal display (LCD) panel with conventional resolution, as known from television and video equipment. This reconstruction system comprises focussing means between the illumination means and the light modulator means. With a modulator resolution of a conventional liquid crystal display, which is rather low for video holograms, they allow a holographically reconstructed scene to be made visible in a reconstruction space which stretches between the spatial light modulator and a visibility region at an eye position in a large viewing angle and with great spatial depth at good resolution for at least one observer.

One disadvantage of such light modulators is that despite the relatively small pitch of their modulator cells, they still have a diffraction angle which is too small for an observer to see a reconstruction with both eyes.

The reconstruction system according to the publication WO 2004/044659 thus additionally discloses a possibility for directing and tracking the position of multiple visibility regions. In particular, the reconstruction system realises a mechanical or electronic offset of the light sources laterally to the optical axis of the system using moving mirrors or multiple differently positioned light sources for displacing the light source images which generate the visibility regions for perceiving the reconstruction.

It is disadvantageous that in a large tracking range, substantial aberrations, which occur when light passes through the focussing means, adversely affect the reconstruction of the spatial scene.

In the international publication WO 2006/119920, titled "Device for holographic reconstruction of three-dimensional scenes", the applicant also discloses a holographic reconstruction system which uses at least one visibility region which is smaller than the modulator surface of the light modulator at an eye position for watching the reconstruction. FIG. 1 shows the functional principle of the prior art system.

An array of light sources LQ1 . . . LQ8 which are capable of generating interference and which are arranged in a matrix and which form a surface-emitting backlight illuminates the modulator surface of a spatial light modulator SLM, and an array of focussing means LA comprises a multitude of imaging elements, e.g. convex lenses, which are adjoined mechanically. Each imaging element of the array of focussing means LA is assigned to multiple light source which are capable of generating interference, so to generate a bundle of illumination units which jointly illuminate the modulator surface, where each illumination unit only covers a sub-region of the modulator surface. The light sources which are capable of generating interference in the illumination units are activated with the help of a switchable modulator matrix SM such that the imaging elements of the array of focussing means image their assigned light source to an eye position. Each illumination unit thus transmits a partial light wave through a sub-region of the modulator surface and, after separate modulation by the individual sub-regions, the partial light waves are superimposed so to form a common visibility region at an eye position $EP_R$.

Directing and tracking the position of the visibility region to changing eye positions is realised by the additional switching modulator matrix SM with modulator cells which can be switched to a transparent state, e.g. by a so-called LCD shutter array. Depending on the current eye position $EP_R$ or $EP_L$, which is detected by an eye finder EF, a system controller SC opens for each imaging element of the array of focussing means a point-shaped light exit I or II for the light which is capable of generating interference, which is focused on the eye position by the imaging elements. This generates a pattern of modulator cells which are switched to a transparent mode. In the case of a lateral change of the current eye position, the position of the visibility region will be adjusted in that the system controller SC laterally displaces the pattern of the modulator cells which are switched to the transparent mode accordingly. In the case of an axial change of the eye position, the system controller SC will modify the distances between the modulator cells in the pattern which are switched to the transparent mode. The mentioned publication also discloses the usage of a switchable light source array with discretely controllable point light sources in order to realise the described process of directing and tracking the light wave field.

However, it has shown that the process of directing and tracking the position of the visibility region by adjusting the propagation of the light wave field according to the described solution exhibits several disadvantages, such as aberrations and great light loss.

The applicant also describes in the international publication WO 2006/119760, titled "Projection device and method for the holographic reconstruction of scenes" a holographic projection system which uses a micro display with a diagonal of few centimeters as light modulator. The device comprises imaging means which image the light which is capable of generating interference in a focal plane, so that a visibility region is generated for an eye position. A first imaging means images a video hologram which is encoded on a light modulator on a focussing display screen in a magnified manner. The display screen images a spatial frequency spectrum of the video hologram at an eye position. An optically enlarged reconstruction of the scene is thus visible when looking from the visibility region towards the display screen in a large viewing angle. The visibility region is thus the image of the used diffraction order in the Fourier plane of the video hologram. As in the previously described reconstruction systems, the light modulator can be encoded such that the reconstruction space continues behind the second imaging means.

The projection system described in the publication WO 2006/119760 further comprises in a special embodiment for directing and tracking the position of the visibility region controllable deflection means, which realise mechanical, electric or optical directing and tracking. The deflection means are disposed either near the first imaging means and virtually displace the spatial spectrum like a prism, or near the display screen and realise prism function and, optionally, a lens function, in order to track the visibility region laterally and, optionally, axially.

All reconstruction systems described above use light modulator means with a discrete modulator cell structure and a resolution which is rather low for holographic applications. On the one hand, as is generally known, the discrete modulator cell structure causes a periodic continuation of the holographic reconstruction in other diffraction orders of a diffraction interval, so that the visibility may be impaired. On the other hand, the mentioned pitch of the modulator cell structure results in a relatively small diffraction angle, so that in practice a diffraction order of a few millimeters up to few centimeters is available for an undisturbed visibility region. It thus makes sense to combine such a device with a position detection and tracking module. That module directs with the help of wave tracking means the modulated light waves at the current eye position, adjusts the position of the visibility region according to the eye position and tracks it each time the eye position changes.

Serving as one example, the reconstruction system described in the publication WO 2004/044659 discloses the method of displacing light sources for directing and tracking the position of the visibility region. In particular, the system displaces active light sources in an array of light sources mechanically or electronically laterally to the optical axis of the system.

All tracking systems mentioned above have the disadvantage that in a large tracking range aberrations of the imaging means have a disturbing effect on the reconstruction of the spatial scene. The aberrations occur because the light is transmitted through the imaging means at different angles, depending on the eye position, in order to reconstruct a scene.

Moreover, the light sources need to be positioned mechanically or, if the light source position is controlled electronically, a high spatial resolution of the light source field needs to be provided. In that case, the array of light sources must comprise a multitude of point light sources for each imaging element of the array of imaging means.

A controllable electro-optic cell, a so-called electrowetting cell, is known from the international publication WO 2004/099847, titled "Electrowetting cell". These cells take advantage of the capillary effect and electrowetting effect in order to modify the surface tension of liquids using electrostatic potential and so to control the optical refraction behaviour. An electrowetting cell basically comprises a capacitor which is filled between the electrodes with a hydrophobic liquid, such as an oil, and water, where one of the electrodes is coated with a hydrophobic material. Without an electric field being applied, the oil covers the coated electrode as a film, and with an electric field being applied, the water displaces the oil film, because the applied field compensates the polarisation of the dipoles in the water surface. The cell can realise electronically controlled optical lenses and prism elements with a surface area of less than one square millimeter.

An autostereoscopic image display device according to the international publication WO 2004/075526, titled "Autostereoscopic display" emits image light points horizontally in a multitude of directions without a tracking device. The image display device has a backlight which emits collimated light which propagates through the image light points of an image representation device towards an array of optical deflection means with dynamically controllable deflection behaviour. The optical elements are in particular electrowetting cells which are used as controllable lenses, and which realise a dynamically adjustable beam controller. In order to avoid the image representation having to be tracked to the current eye position of observers, a system controller frequently modifies with the help of the controllable array of optical deflection means both the exit angle of the light and the image content of the image representation device during each video image period. Thereby, up to one hundred emission directions are served in each video image period using a combination of space-division and time-division multiplexing, said emission directions lying closely side by side horizontally and having the form of image sectors, so that each observer eye sees video images which differ in parallax without the need of tracking. The optical deflection means thus pan the beams which are temporally differently modulated by the image representation device over the multitude of the image sectors which lie closely side by side. The publication does not disclose any technical means which would explain how the system controller can deflect a modulated wave field which is capable of generating interference with the help of the array of optical deflection means.

In contrast to the subject of the present invention, the international publication WO 2004/075526 relates to an autostereoscopic image display device which does not reconstruct object light points in a holographic manner as a three-dimensional arrangement in a viewing space. Instead of the reconstructed object light points, an autostereoscopic image display device displays two-dimensional images in the modulator plane, said two-dimensional images having the form of luminous image points which carry multiple image information for both observer eyes. The cited document does not suggest in any way that light diffraction or light interference have any useful function for image representation. The dynamically adjustable beam controller is designed to deflect bundles of rays with incoherent light in a simple manner and does not make any demands on the conditions for mutual interference of the deflected light beams. The bundles of rays, which lie close to each other, are in particular not able to prevent light of parasitic diffraction orders from entering.

Moreover, a non-linear transmission behaviour in the boundary zones of the electrowetting cells would affect the propagation of the modulated light waves which are capable of generating interference, and would substantially disturb the interference behaviour of the reconstruction system and thus the quality of the reconstruction.

The publication does not disclose any technical means which would explain how the system controller can deflect a modulated wave field which is capable of generating interference with the help of the array of optical deflection means and how the effects of parasitic diffraction orders can be circumvented.

SUMMARY OF THE INVENTION

Now, the object of the present invention is to provide a holographic reconstruction system with opto-electronic wave tracking means, where the modulated light waves follow a widely constant optical path through the reconstruction system, independently of the current eye position of an observer in a tracking range, so that the demands made on the optical elements of the system are minimised and a large part of the optical path of the reconstruction system can be integrated into a correction of the optical wave propagation prior to reconstructing the scene under static conditions. Moreover, there shall be no light loss if possible during the process of directing, and the optical transmission behaviour of the optical components of the wave tracking means shall be adapted to the strict conditions needed to generate interference, so that the object light points of a three-dimensional scene are reconstructed free of errors as regards their local position in the structure of the scene and their light intensity values which shall be as close to the original as possible. The need for precise alignment of the wave tracking means with the structure of the modulator cells of the light modulator means shall become superfluous.

The present invention is based on a holographic reconstruction system for the three-dimensional reconstruction of object light points of a scene, comprising spatial light modulator means which modulate light waves which are capable of generating interference and which are emitted by illumination means with at least one video hologram.

Optical focussing means focus the modulated light waves with the reconstructed object light points for at least one eye position of observer eyes, and a system controller directs with the help of electro-optic deflection means the focussed, modulated light waves at at least one eye position and tracks them accordingly when the eye position changes. The light modulator means modulate the light waves such that they reconstruct the object light points in front of the eye position irrespective of the directing and tracking of the light wave.

According to this invention, the electro-optic deflection means comprise at least one array of deflection means with controllable micro-cells, said array comprising a multitude of regularly arranged electrowetting cells, which are known as such, with discretely controllable light deflection.

If the regularly arranged electrowetting cells in the array of deflection means exhibit a cell pitch of only few micrometers, an array of micro-cells functions like a controllable diffraction grating with changing surface relief structure under coherent illumination. This diffraction grating can be controlled by a system controller to serve either as an amplitude grating structure or, preferably, as a phase grating structure which diffracts the coherent light in a periodic diffraction spectrum with a multitude of diffraction orders. Among the optical diffraction gratings, a controllable phase grating has the advantage that it affects the light phase instead of the light amplitude. In an ideal phase grating, the intensity will thus not be reduced. There is ideally no light loss.

A diffraction of coherent light in a periodic diffraction spectrum with a multitude of diffraction orders brings about the fact that deflection angle of the exiting wave field of such electro-optic deflection means cannot be controlled continuously. When varying the prism angle of the controllable micro-cell by a controlling electric field, the diffraction efficiencies in the individual diffraction orders of the exiting light waves will change. This means that the intensity distribution is related to angles which are determined by the grating equation. A variation of the prism angle, i.e. the surface inclination of the prism in the controllable micro-cell which is effected by the controlling electric field, corresponds with a variation of the diffraction efficiencies in the individual diffraction orders; i.e. the light waves only propagate in discrete directions, where the intensities in these directions can be varied.

Despite the discrete switching of angles in such a grating structure of the controllable micro-cells, it can also be used in a reconstruction system according to this invention for continuously controlling the deflection angle of the exiting wave field which is capable of generating interference. For this, the system controller realises with the help of the controlling electric field such a prism angle that the grating diffraction order which exhibits the greatest diffraction efficiency lies closest to the target direction of the current eye position and varies the angle of incidence of the coherent illumination of the array of deflection means such that the deviation of this grating diffraction order from the target direction is compensated and the exiting wave field which is capable of generating interference is directed at the desired eye position.

An alternative for continuous tracking is that the phase transmission behaviour of adjacent micro-cells is continuously changed with the help of discrete phase shifting means disposed in the optical path and adjacent controllable micro-cells are combined to form a compound cell in order to increase the spacing of the micro-cells in the grating. A changed spacing of the grating makes it possible to realise different deflection angles.

A disadvantage of electrowetting cells is that their transmittance is reduced as the deflection angles rise, because a larger portion of light is diffused. If the light falls on optical media which exhibit different refractive index at an oblique angle, they will only transmit part of the light. If the angle of incidence is larger than the angle of total reflection, no light will be transmitted at all. As the prism angle increases, more diffused light occurs in the micro-cells, which disturbs their function because of multiple reflections and thus adversely affects the holographic reconstruction. According to this invention, the side walls of the micro-cells are designed such that they absorb reflected diffused light as so-called light traps.

In a special embodiment of the present invention, the side walls of the variable micro-cells are hydrophobic and electrically insulating. The hydrophobic layer provides the necessary wetting properties with its surface roughness. The material which is used for coating the side walls can preferably be of an absorbing type. A further feature for realising absorption is to coat the side walls with a hydrophobic layer which is very thin, i.e. only fractions of the wavelength λ of the illumination. It allows an absorbing material, which does for example not exhibit the required wetting properties, to be disposed between electrode and hydrophobic layer. The latter embodiment has the additional advantage to prevent insufficient electric insulation, e.g. as caused by a porous plastic material.

A further disadvantage of electrowetting cells is that their function exhibits a temperature dependence which cannot be neglected. The refractive index of optical materials depends on the temperature, i.e. n=n(T). For example, oil exhibits changes in the refractive index which must be taken into consideration and compensated. A change in the temperature in the micro-cells brings about a change of the refractive index n of the materials the micro-cell is filled with. This causes a change in the optical path of the light through the cells. Consequently, changes in the temperature of the micro-cells affect the phase behaviour and the angle of light propagation. A change in the refractive index corresponds to a change in the gradient of the phase function which is realised across the surface of the respective cells in the grating.

If the array of deflection means is controlled such that the diffraction efficiency is maximised for the diffraction order which realises the desired tracking angle, then for example a change in the temperature by few degrees causes a change in the diffraction efficiencies of the individual diffraction orders such that other diffraction orders which do not lie in the direction of the desired tracking exhibit an increased intensity, which results in a disturbance of the ideal hologram reconstruction.

In order to compensate this disadvantage, the reconstruction system according to this invention comprises technical means:

- For detecting changes in the temperature and resultant changes in the phase, i.e. the optical path length modulo $2\pi$ and to correct them,
- For measuring the temperature T and/or the temperature distribution T(x,y) in order to realise a compensation of the changes in the refractive indices of the materials used in the cell arrays with the help of correction tables, i.e. for example with a known curve of the function n(T),
- For measuring the temperature and/or temperature distribution with the help of temperature sensors which are disposed in the plane of the array of deflection means using optically scanning or optically imaging IR sensors, in order to be able to realise a sufficient measuring accuracy of the function T(x,y) for the actual arrangement.

Sensors which are integrated into the panel can be realised easily for example in the form of resistors which exhibit a sufficiently high gradient of the function R(T) in the temperature range to be considered.

Alternatively to measuring the temperature or temperature distribution it is also preferably possible to measure the change in the optical path length caused by the change in temperature, i.e. the change in the phase $\phi=\phi(T)$, and to effect a correction of the prism angles to be controlled based on those measured values.

A wave front can for example also preferably be measured with the help of a wave front sensor, thus checking the quality of the reconstruction. The wave front can be guided out of the optical path sideways so that a measurement and evaluation can be conducted during operation.

Alternatively to measuring the temperature or temperature distribution, it is further preferably be possible to measure the change in the optical path length caused by the change in temperature, i.e. the change in the phase through a change in the intensity distribution $I=I(\phi(T))$. This means that suitably chosen intensity distributions, which are detected by a camera, serve for an active monitoring of the function of the reconstruction.

An intensity distribution which serves to monitor the quality of the reconstruction can for example also be uncoupled sideways out of a plane behind the SLM through a grating with very low diffraction efficiency. In a projection-type arrangement, a sideways uncoupling can be achieved for example with the help of a coplanar plate.

The correction can involve an iteration. Ambivalence in the system of equations can be eliminated by a set of additionally introduced variables, i.e. for example $\phi_i(x, y)$ and/or $I_i(x, y)$.

A direct and simple way of measuring the relative phase which occurs among individual micro-cells and the modulator cells in a system which is illuminated with coherent light is to evaluate the interference of one or multiple spherical waves which are emitted by the considered points.

Spherical waves which are emitted by adjacent points and which are coherently superimposed create an interference pattern in the common overlapping region. This pattern, for example a striped pattern, can be evaluated directly in that the position of the stripes is measured and the relative retardation is derived. The position can be found easily using the methods of threshold definition and edge detection. The position of the stripes can alternatively be found with the help of a Fourier transformation (carrier frequency method). The additional introduction of for example 5 phases $\phi_i(x,y)$ with $I=1\ldots5$, i.e. the use of phase-shifting interferometry, allows measuring uncertainties of $<2\pi/200$, i.e. measuring uncertainties in the path length difference of $<\lambda/200$.

The relative phase among multiple points can be determined between the image sequences of the reconstruction, i.e. for example in that all points except the points to be measured are given the value zero. A camera can synchronously record the resultant intensity distribution. In phase-shifting interferometry, it is also possible that image sequences lie between the introduced phase shifts.

In a very short period of time, the relative phase of a sufficient number of points can for example be measured so that a phase correction can be carried out which may for example become necessary due to a change in temperature. Integrating the relative phase position over the area results in a phase distribution of the entire considered plane, i.e. except a constant portion, which can generally be neglected. A holographic display which has means for uncoupling partial waves thus serves itself as an interferometer, which can be used to detect changes in the wave front. This way of measuring the phase distribution is generally advantageous in systems with phase-shifting cell elements, e.g. for image generation.

A further problem of micro-cells is the dependence of their function on the applied electric voltage. The contact angle and thus the prism angle depend on the applied voltage or voltage difference. Estimations show that the angular range of the liquid cells should be controlled with at least 10 Bit, i.e. $2^{10}=1024$ values. The influence of external interfering electric fields must thus be kept at a minimum. This is achieved according to a further feature of this invention in that the micro-cells are electrostatically shielded. This is preferably achieved with a coating on the top and bottom face of the panel which is suited to discharge electric loads while being sufficiently transparent. This can for example be a photolithographic coating. Adjacent electrodes which serve to control the micro-cells must be insulated against each other, where an electrode is disposed between them which serves for shielding, i.e. which carries a potential of V=0, for example.

Micro-cells for two-dimensional deflection are in particular dependent on applied voltage differences. Since the prism wedge angles depend on the voltage differences, fields which are generated by the control electrodes are superimposed near the edges of the cells in micro-cells which realise a 2D deflection.

In the case of a 2D deflection, cross-talking is reduced in that additional electrodes which carry a fix potential, for example 0 V, are disposed between the control electrodes.

In materials which have a high surface energy, the introduction of directly or indirectly controllable electrodes (FIG. 4: $U_{ij}(x, y)$) between the electrodes which serve for 2D deflection provides the possibility to realise interfaces which are more planar towards the marginal areas of the cells. In the corners, contact angles can be achieved which allow targeted counteraction of marginal curvatures or capillary action.

Due to reasons which lie in the manufacturing process, liquid cells can exhibit phase fluctuations which cannot be neglected. Filling arrays of electrowetting cells with liquid components is more prone to fluctuations in the filling levels than for example phase-modulating light modulators which only have one liquid crystal. A fluctuation of the phase, or a phase offset among individual cells adversely affects the reconstruction of the object. Non-uniform filling of individual micro-cells with two optical media causes irregular optical paths of the light through the cells. This means that fluctuations in the filling volume of the individual components of the micro-cells correspond with fluctuations of the phase of the light which propagates through the cells. A deflection field of non-uniformly filled cells realises phase irregular shifts.

The reconstruction system thus comprises technical means for detecting fluctuations in the phase, i.e. in the optical path length modulo $2\pi$, realised in individual cells and to consider them during the encoding of the holograms.

For compensating phase errors, phase-shifting elements are additionally disposed in the optical path which realise an additional phase shift such that the optical path length is corrected.

In the event of high switching frequencies, electrowetting cells can exhibit intrinsic resonance and generally exhibit oscillations of the interface. This means that in the event of high switching frequencies oscillations of the interface with high amplitude can occur, and the cells can only realise a defined phase wedge at a time average.

The oscillation can be reduced by using suitable control pulses $U(t)$, or $U_1(t)$ and $U_2(t)$. The pulse curve is preferably not chosen in the form of a ramp function, but such to effect a maximum suppression of a resonance. Optimum pulse shapes are material-specific and can be found using a model or empirically. Moreover, $I(t)$ can also be chosen such to have a suitable value, or it can be given a limit.

The temperature dependence can be stored in a correction table and be used for correcting the pulse shapes depending on the temperature.

Moreover, electrowetting cells show ageing effects, which are for example caused by chemical reactions. Hydrophobic plastic materials are slightly porous at considered layer thicknesses of <500 nm. Teflon, for example, shows an expansion when in contact with oil. This corresponds with a reduced electric insulation and increases in dependence on the switching frequency the power loss, i.e. it contributes to the generation of heat in the plane of the liquid cells.

For reasons of cost reduction and simplification of the manufacturing process, metal electrodes, e.g. made of copper, are preferably used. However, contact with water and/or oil causes corrosion of such electrodes. In addition, ions which diffuse into them, e.g. metal ions, change the chemical potentials and thus modify the function of the electrowetting cells.

Depositing an electrically insulating layer on the electrode to serve as diffusion-blocking layer reduces the power loss and prevents oxidation processes which would occur between the electrodes and the liquids of the electrowetting cells.

The disadvantage of porous hydrophobic plastic coatings can be circumvented by not using such plastic materials. Hydrophobic surface properties can for example be created in plasma processes. It is for example also possible to create a hydrophobic surface on silicon oxide with the help of a modified etching process, said surface not showing the disadvantages of plastic coatings.

DETAILED DESCRIPTION

Figure 1:
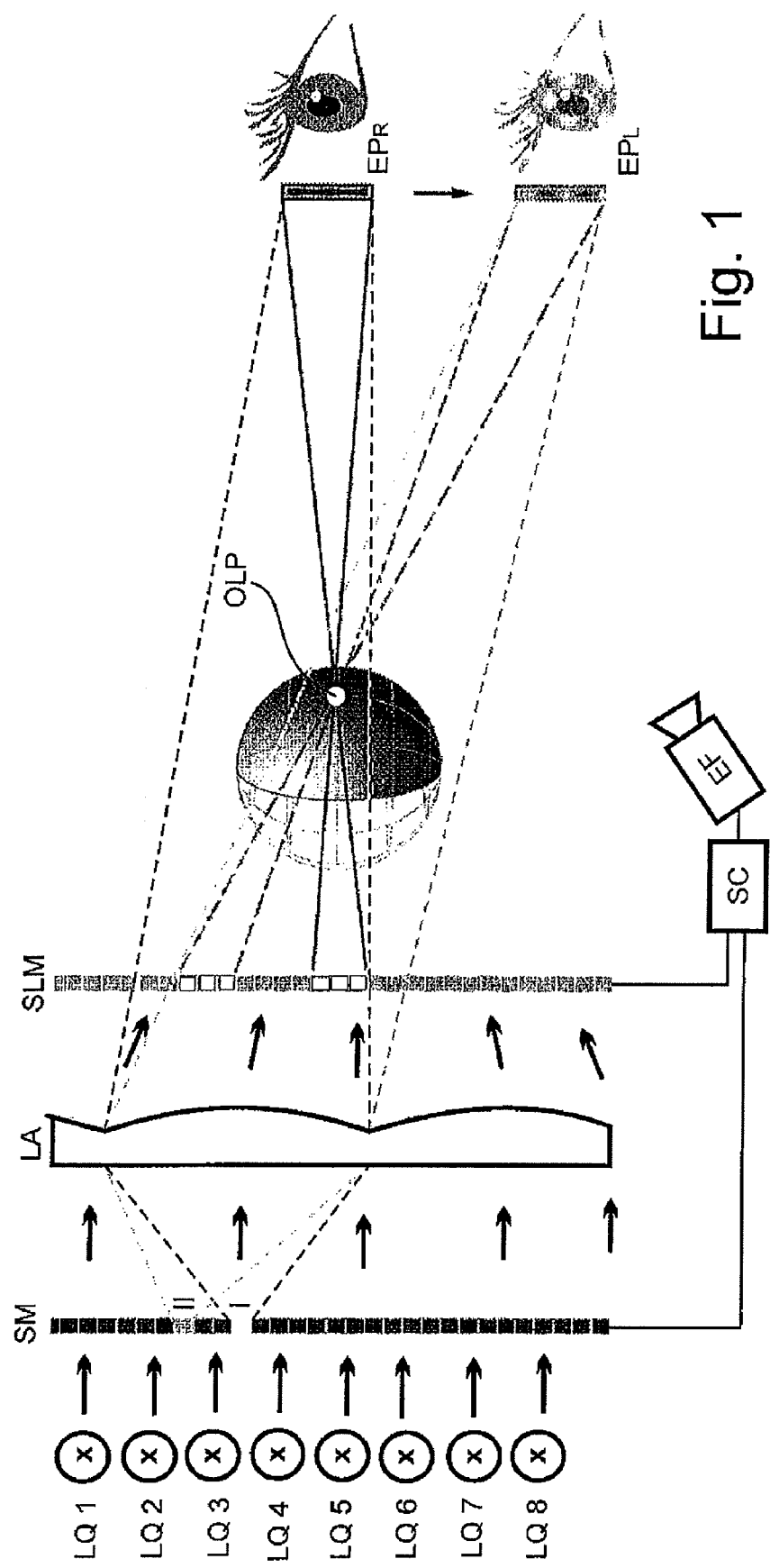
FIG. 1 shows a holographic reconstruction system known from the international publication WO 2006/119920 which tracks the light wave field which is capable of generating interference without the means according to this invention.
Figure 2:
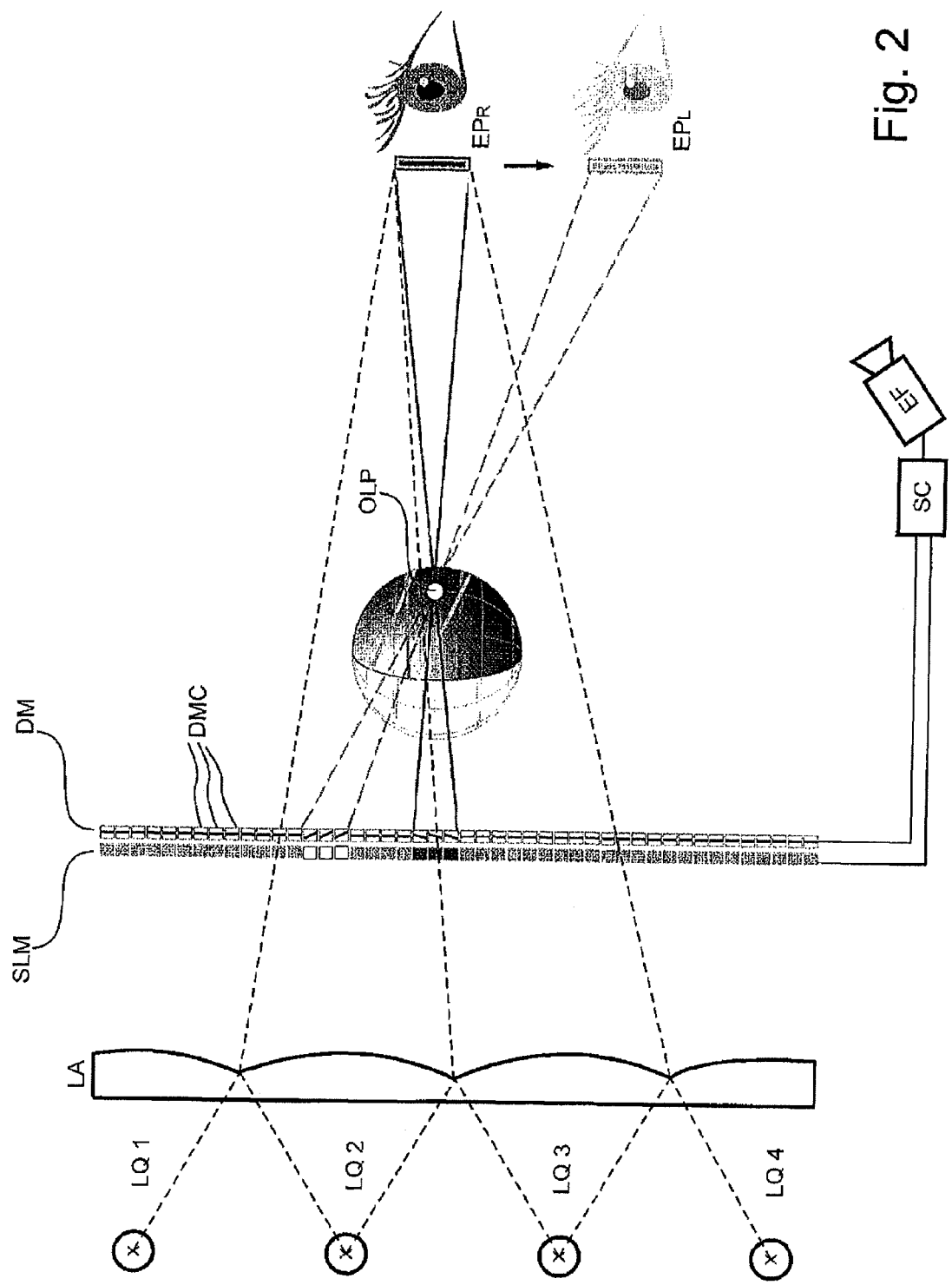
FIG. 2 shows a holographic reconstruction system according to the international publication WO 2006/119920 which uses instead of a switching matrix SM an array of deflection means DM with a diffractive micro-cell structure for tracking the light wave field which is capable of generating interference.
Figure 3:
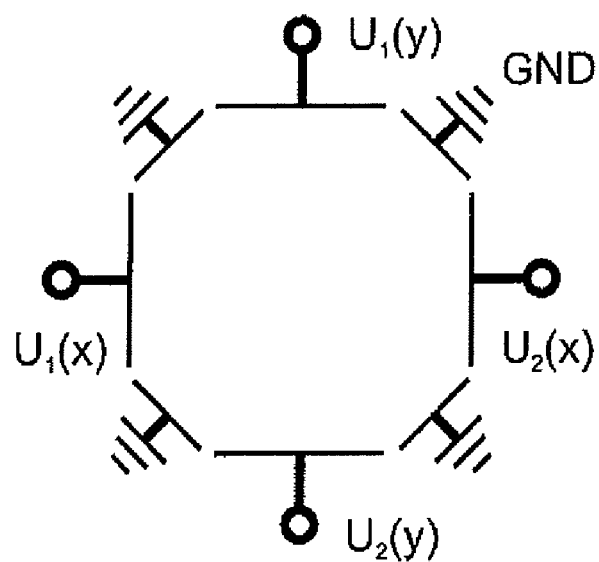
FIG. 3 shows the structure of a single micro-cell, where in the case of a 2D deflection cross-talking is reduced in that additional electrodes which carry a fix potential, for example V=0, are disposed between the control electrodes.
Figure 4:
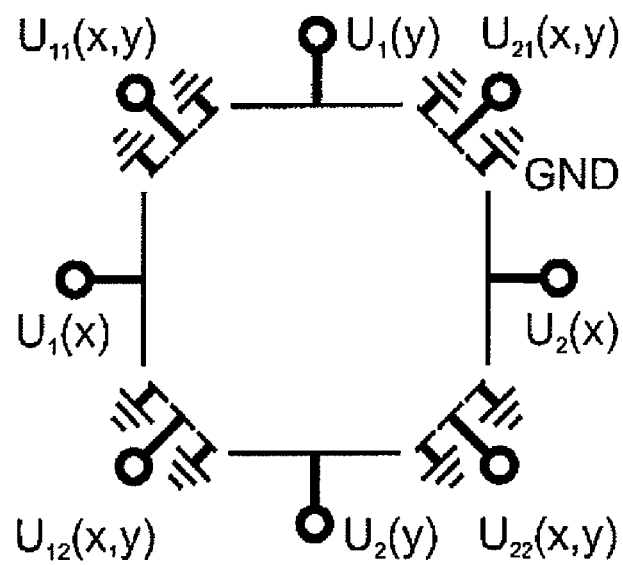
FIG. 4 shows the introduction of controllable electrodes in micro-cells, said electrodes serving to realise plane interfaces also in the marginal areas of the cell.

FIG. 2 shows a holographic reconstruction system for the three-dimensional reconstruction of object light points of a scene according to this invention. The system comprises:
  Spatial light modulator means SLM, which modulate light waves which are capable of generating interference and which are emitted by illumination means LQ1 to LQ4 with at least one video hologram,
  Optical focussing means LA in the form of a lens array which focus the modulated light waves with the reconstructed object light points OLP (of which an exemplary one is shown in the drawing) on at least one eye position $EP_R$ or $EP_L$ of observer eyes.

In FIG. 2, the scene to be reconstructed is represented exemplarily by only a single light point OLP.

A system controller SC controls electro-optic deflection means DM which direct the focussed, modulated light waves with the reconstructed object light points at at least one eye position $EP_R$ or $EP_L$, and which track them accordingly when the eye position changes.

According to this invention, the controllable electro-optic deflection means DM are an array of deflection means with electronically addressable micro-cells DMC, which are preferably be disposed at the optical exit of the system, i.e. after the light modulator SLM in the optical path.

The array of deflection means has such a cell grid with a periodic structure that the separately controllable micro-cells realise the function of a controllable diffraction grating with variable surface relief structure under coherent illumination. With the help of electric control signals, the system controller SC can change the optical diffraction behaviour within diffraction orders in a diffraction spectrum of the surface relief structure. The array of deflection means is preferably operated as a phase grating in order to minimise the light loss when directing the modulated wave field.

In an embodiment, the array of deflection means comprises electrowetting cells with a hollow body which is filled with an optically transparent liquid. The surface of the liquid has specific contact angles where in contact with the walls of that hollow body. The contact angles of the liquid in the hollow body are constant for given, temporally unchangeable geometries, materials and conditions, and they can be found with the help of Young's equation. If an electric field is applied e.g. in the dielectric system between the liquid and one of the walls of the hollow body, or between two opposing side walls of the hollow body, the equilibrium conditions will change, and thus the contact angles formed between the surface of the liquid and the side walls of the hollow body will change. This electrowetting effect can be described with the help of Lippmann's equation. The contact angles and thus the shape of the liquid surface are modified by varying one or multiple electric fields, thereby changing the deflection of the transmitted light beam in accordance with the laws of refractive optics.

For example, the hollow body can be cylindrical and have a rectangular base, so that opposing side walls form pairs of electrodes of a capacitor. Electrically insulating layers, preferably made of hydrophilic material, are disposed between electrodes and electrically grounded liquid. If the capacitors are turned off, the liquid will exhibit an almost spherical surface, which is why only locally restricted light beams can be deflected according to the local curvature of the surface.

When realising a prism function for an extended bundle of rays, a constant prism angle of the electrowetting cell is required across the entire diameter of the bundle of rays. In order to achieve this, the contact angles at the opposing electrodes are adjusted independent of each other by controlling the opposing electrodes with certain voltages. The control voltages can for example be chosen such that two opposing contact angles both have 90 degrees. In that case there is no prism effect, i.e. the electrowetting cell functions as a coplanar element. There are other pairs of control voltages, for example such that two opposing contact angles differ in their amount, but whose sum is 180 degrees. In that case the element functions like a prism. The electrodes can preferably be switched in pairs, so that deflections in both x direction and y direction can be realised, and that the visibility region can thus be tracked to the observer two-dimensionally.

According to an alternative embodiment, an electrowetting cell can also comprise a hollow body which is filled with multiple immiscible, optically transparent liquids. The refractive index changes at the interface between the liquids, so that the transmitted light is deflected. The advantage of using multiple, preferably two, liquids is that the liquids are encapsulated. This means that the cell body is fully closed and completely filled with the liquids. In addition, gravity problems can be prevented by choosing liquids with suitable densities. This means that if both liquids have about the same density, the arrangement of the liquids inside the cell bodies will not or only insignificantly change due to the forces of gravity if the electrowetting cells are moved, or in case of shocks or vibration etc. Further, the base of the cell body does not necessarily have to be rectangular, it can as well be a hexagon or octagon. It is further possible, that such liquid cells are connected in series, i.e. multiple liquid cells are disposed one behind another, seen in the direction of light propagation.

The invention claimed is:

1. Holographic reconstruction system for the three-dimensional reconstruction of object light points of a scene, comprising:

Spatial light modulator means, which modulate light waves which are capable of generating interference and which are emitted by illumination means with at least one video hologram, Optical focussing means which focus the light waves with the reconstructed object light points on at least one eye position of observer eyes, and Electro-optic deflection means which are controlled by a system controller to direct the focussed, modulated light waves with the reconstructed object light points at at least one eye position, and which track them accordingly when the eye position changes, wherein the controllable electro-optic deflection means are an array of deflection means with electronically addressable micro-cells, which has such a periodic structure in a cell grid that the separately controllable micro-cells realise the function of a controllable diffraction grating with variable surface relief structure under coherent illumination, where the system controller changes the optical diffraction behaviour within diffraction orders in a diffraction spectrum of the surface relief structure.

2. Holographic reconstruction system according to claim 1, where the array of deflection means is operated as a phase grating in order to minimise the light loss when directing the modulated wave field.

3. Holographic reconstruction system according to claim 1, where the system controller controls the prism angles in the electronically addressable micro-cells of the array of deflection means such that in the grating diffraction spectrum of the array of deflection means the grating diffraction order which exhibits the greatest diffraction efficiency lies closest to the target direction of the current eye position, and where the system controller varies the angle of incidence of the illumination means such that the deviation of this grating diffraction order from the target direction is minimised, so that and the exiting wave field which is capable of generating interference is directed at the desired eye position.

4. Holographic reconstruction system according to claim 3, where the control unit moves the light sources in order to compensate the deviation of the grating diffraction order from the desired target direction.

5. Holographic reconstruction system according to claim 3, where the system controller varies the deflection of the light waves which are capable of generating interference between adjacent diffraction orders in the diffraction spectrum by combining multiple micro-cells to form a controllable phase grid in order to control deflection values between the diffraction orders by reducing the priority interval.

6. Holographic reconstruction system according to claim 1, where the array of optical deflection means comprises electrowetting cells.

7. Holographic reconstruction system according to claim 6, where the side walls of the electrowetting cells are designed such that they absorb the reflected diffused light.

8. Holographic reconstruction system according to claim 6, where the side walls of the electrowetting cells are hydrophobic and electrically insulating.

9. Holographic reconstruction system according to claim 6, which comprises means for electrostatic shielding between the electrowetting cells.

10. Holographic reconstruction system according to claim 6, which comprises transparent conductive means which serve as lids for the electrowetting cells.

11. Holographic reconstruction system according to claim 6, which comprises means for temperature compensation of the electrowetting cells.

* * * * *